(12) United States Patent
Oehrlein et al.

(10) Patent No.: US 10,760,821 B2
(45) Date of Patent: Sep. 1, 2020

(54) HEATING DEVICE HAVING A HOLDING APPARATUS TO ACCOMMODATE A CONTROL UNIT

(71) Applicant: Robert Bosch GmbH, Stuttgart (DE)

(72) Inventors: Manfred Oehrlein, Schlierbach (DE); Marcus Wuenning, Shanghai (CN); Sebastian Goerick, Moeglingen (DE); Yildirim Cantuerk, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 15/950,997

(22) Filed: Apr. 11, 2018

(65) Prior Publication Data

US 2019/0162446 A1 May 30, 2019

(30) Foreign Application Priority Data

Nov. 30, 2017 (DE) .......................... 10 2017 221 498

(51) Int. Cl.
  *F24H 9/20* (2006.01)
  *F24H 9/02* (2006.01)
  *F24H 9/16* (2006.01)
  *F24H 3/00* (2006.01)

(52) U.S. Cl.
  CPC ................. *F24H 9/20* (2013.01); *F24H 9/02* (2013.01); *F24H 9/16* (2013.01); *F24H 3/004* (2013.01); *F24H 2250/00* (2013.01)

(58) Field of Classification Search
  CPC ..... F24H 9/20; F24H 9/02; F24H 9/16; F24H 3/004; F24H 2250/00; F24H 9/06; F24H 9/2007
  USPC .......................................... 174/535
  See application file for complete search history.

(56) References Cited

U.S. PATENT DOCUMENTS

| | | | |
|---|---|---|---|
| 9,179,800 B2 * | 11/2015 | Harward | A47J 39/02 |
| 2010/0133263 A1 * | 6/2010 | Toyoda | H05B 6/6414 |
| | | | 219/681 |
| 2014/0263285 A1 * | 9/2014 | Tippmann | A47J 37/0611 |
| | | | 219/620 |

FOREIGN PATENT DOCUMENTS

| | | |
|---|---|---|
| DE | 3624654 A1 | 1/1988 |
| DE | 20105148 U1 | 6/2001 |
| DE | 102004025927 A1 | 3/2006 |
| DE | 102014222758 A1 | 5/2016 |
| EP | 1193454 A1 | 4/2002 |
| FR | 2697618 A3 | 5/1994 |
| FR | 2865887 A1 | 8/2005 |

* cited by examiner

*Primary Examiner* — Sherman Ng
(74) *Attorney, Agent, or Firm* — Norton Rose Fulbright US LLP; Gerard Messina

(57) ABSTRACT

A heating device having a holding apparatus to accommodate a control unit, the holding apparatus having a receiving part. The receiving part has at least two struts, and a receptacle for the control unit is developed between the at least two struts. A holding apparatus for a heating device is also described.

8 Claims, 14 Drawing Sheets

HEATING DEVICE HAVING A HOLDING APPARATUS TO ACCOMMODATE A CONTROL UNIT

CROSS REFERENCE

The present application claims the benefit under 35 U.S.C. § 119 of German Patent Application No. DE 102017221498.8 filed on Nov. 30, 2017, which is expressly incorporated herein by reference in its entirety.

FIELD

The present invention relates to a heating device having a holding apparatus to accommodate a control unit, the holding apparatus including a receiving part. In addition, the present invention relates to a holding apparatus for a heating device including a receiving part.

BACKGROUND INFORMATION

German Patent Application NO. DE 10 2014 222 758 A1 describes a device for controlling and/or regulating a heating or household device in a heating or home installation, which has an operating device and a control panel; the heating or household device has a housing including a flap, the flap accommodating at least parts of a control for the heating or household device and making it accessible from the outside. The flap is meant to separate the operating device from the control panel.

SUMMARY

An example device in accordance with the present invention may have the advantage that the receiving part has at least two struts, and a receptacle for the control unit is developed between the at least two struts. This makes it possible to develop the holding device in a particularly stable manner for the accommodation of the control unit.

Advantageous further developments of the present invention are described herein. For example, the receiving part may be developed in a U-shape so that the accommodation and wiring of the control unit are able to be simplified.

It may be advantageous if at least one of the at least two struts has a thrust bearing via which the holding device is able to be attached to the heating device, in particular to a housing structure of the heating device, which allows for a simpler mounting of the holding device on the heating device.

It may also be advantageous if at least one of the at least two struts has at least one construction for attaching detent elements, in particular in a region that is at a distance from the thrust bearing, which allows for a technically elegant affixation and thus in particular for a simplified opening and closing of the holding apparatus.

It may also be advantageous if at least one of the at least two struts has a cable duct and/or forms a cable duct so that routed cables in the wiring of the control unit are able to be stowed there.

In addition, it may be advantageous if the receiving part has at least one receptacle for cable bushings, especially sleeves and/or strain-relief mechanism, preferably adjacent to at least one of the at least two struts, so that the cable routing may be further stabilized.

It may be particularly advantageous if the receiving part includes at least one means for attaching a cover, in particular a flap, which is able to protect electrical connections or electrical components from a fluid, in particular spray water, so that electrical short circuits, especially under an influence of spray water, are able to be avoided.

It is also especially advantageous if the receiving part has at least one duct and/or at least one opening for the discharge of water, which avoids water from permanently collecting in the holding apparatus.

It is also advantageous if the receiving part has a receptacle for a switching unit, in particular a modular switching unit, and/or an actuator unit, provided to perform and/or initiate the activation and/or deactivation of the heating device and thus allowing for a simplified mounting of the switching unit and/or the actuator unit on the heating device In addition, the present invention relates to a holding apparatus for a heating device, in particular for a heating device according to the preceding description, which includes a receiving part. In contrast to the cited related art, the holding apparatus offers the advantage that the receiving part has at least two struts, and a receptacle for the control unit is developed between the at least two struts so that the holding device is able to be given a particularly stable design for the accommodation of the control unit.

BRIEF DESCRIPTION OF THE DRAWINGS

An exemplary embodiment of the present invention is schematically illustrated in different ways in the figures and described in greater detail below.

DETAILED DESCRIPTION OF EXAMPLE EMBODIMENTS

Figure 1:
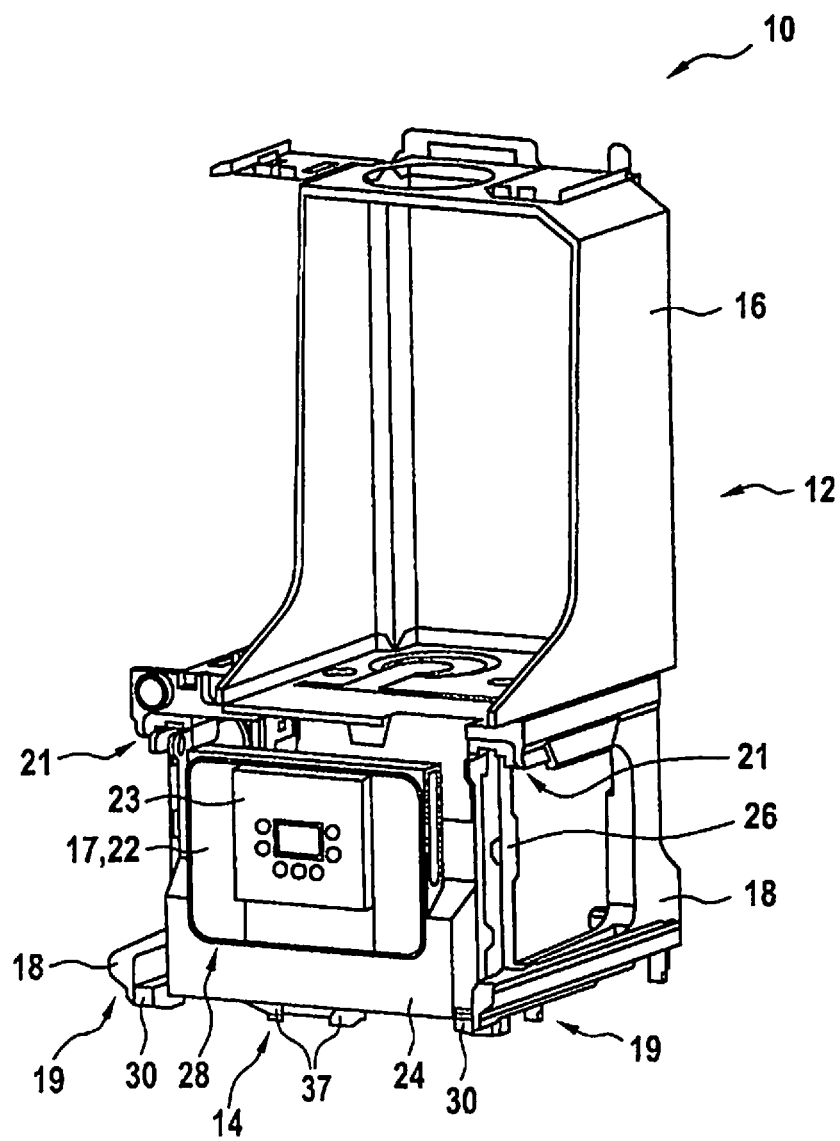
FIG. 1 shows an illustration of an exemplary embodiment of a part of a heating device, together with a holding apparatus for the accommodation of a control unit

FIG. 1 shows an illustration of an exemplary embodiment of a part 10 of a heating device; in the illustrated case, this is a housing structure 12 of the heating device, which has a holding apparatus 14 for the accommodation of a control unit 22 or a housing 17 of a control unit 22. Holding apparatus 14 accommodates control unit 22 or housing 17 of control unit 22 in the illustrated case, while control unit 22, or housing 17 of control unit 22, accommodates an operating unit 23, which is able to be operated by a user. Housing structure 12 includes a wind box 16 and two structural elements 18.

Holding apparatus 14 has a receiving part 24. Control unit 22 or housing 17 of control unit 22 is introduced into receiving part 24. In the illustrated case, receiving part 24 has two struts 26, and a receptacle 28 for the control unit is developed between the at least two struts. Struts 26 allow for a particularly stable development of holding apparatus 14 and for its stable mounting on housing structure 12.

Holding apparatus 14 for accommodating control unit 22 is fixed in place on the heating device or on housing structure 12 of the heating device in a pivotable or flippable manner. In the illustrated case, holding apparatus 14 is in a closed position. It is fixed in place in a lower region 19 of structural elements 18 and in an upper region 21 of structural elements 18.

Figure 2:
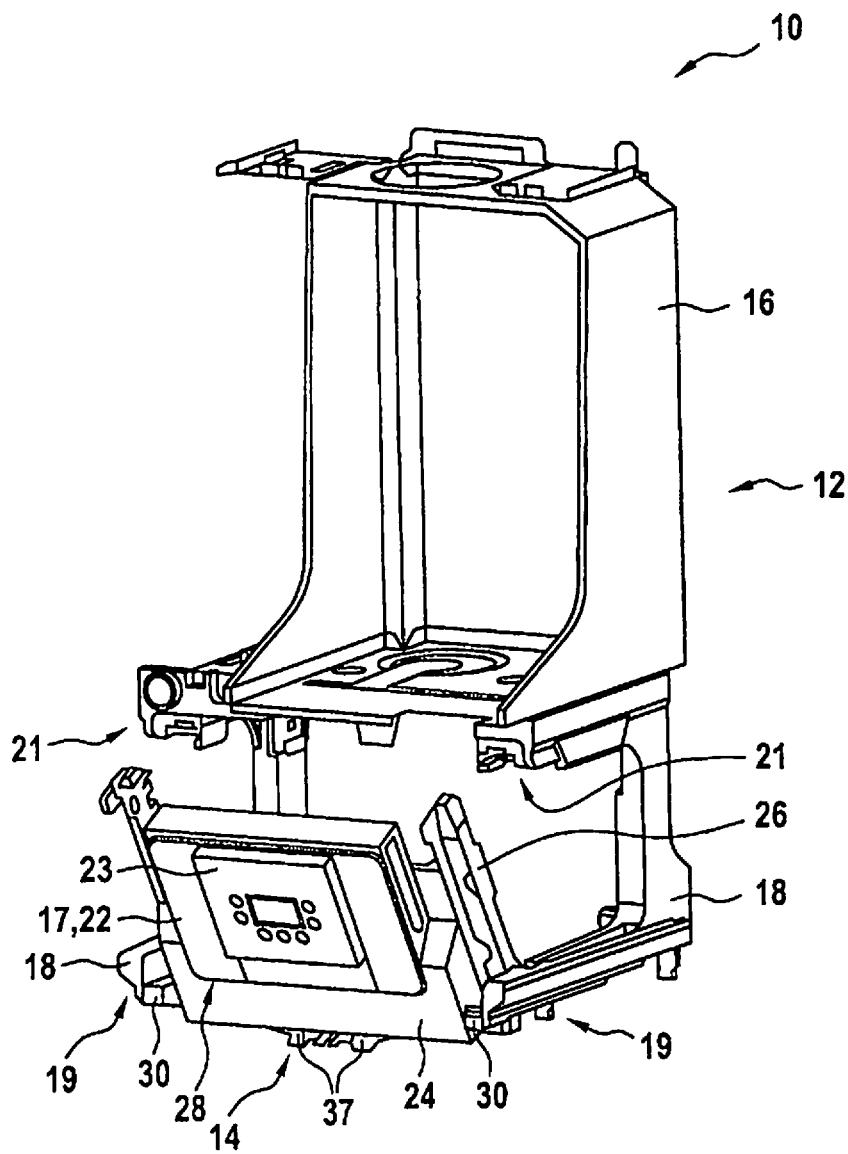
FIG. 2 shows an illustration of the exemplary embodiment from FIG. 1 with a holding apparatus that is partially flipped open.

Accordingly, FIG. 2 shows an illustration of the exemplary embodiment from FIG. 1 with a holding apparatus 14 that is partially flipped open. Holding apparatus 14 is disposed so that it is able to be opened toward the front, or away from the heating device or housing structure 12 of the heating device.

It can also be seen that structural elements 18 are developed in the form of a C. The holding apparatus is mounted on structural elements 18 in a pivotable or flippable manner via a thrust bearing 20 (see also FIG. 5) in lower region 19 of structural elements 18.

Figure 3:
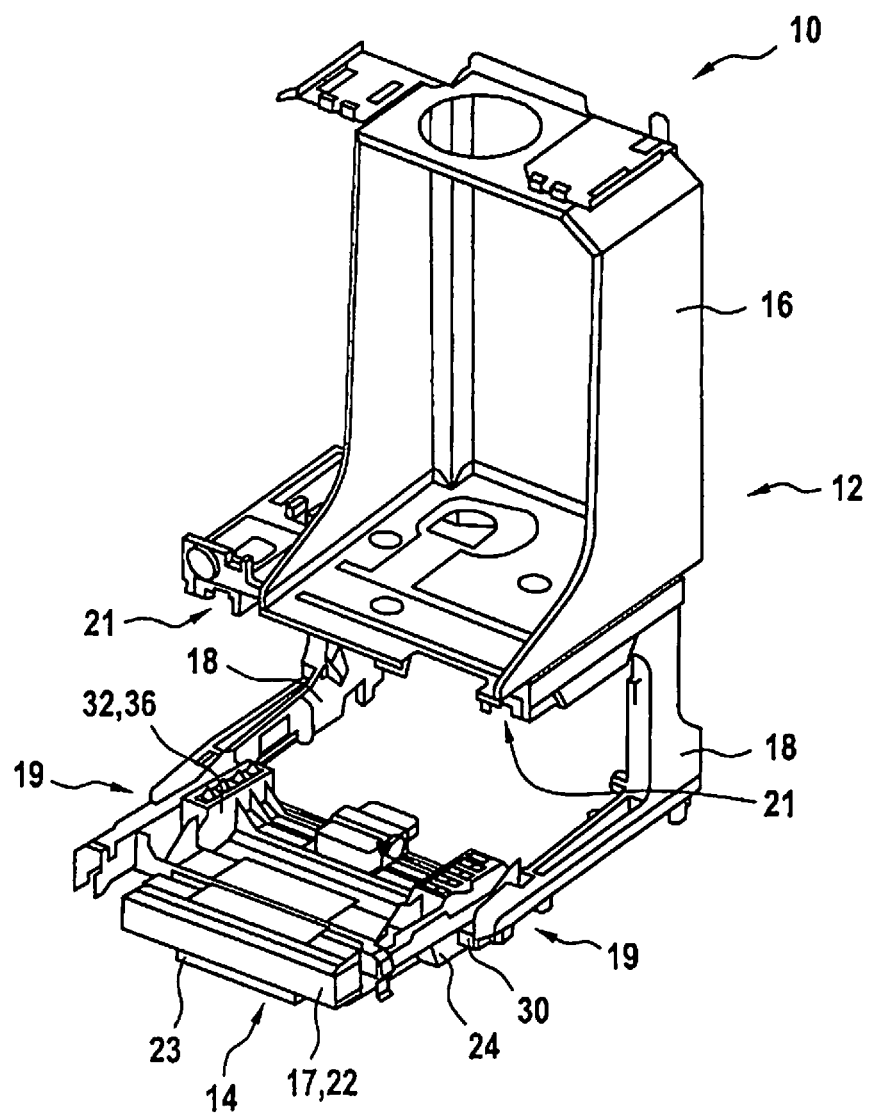
FIG. 3 shows an illustration of the exemplary embodiment from the preceding figures with a holding apparatus that is fully flipped open.

Accordingly, FIG. 3 shows an illustration of the exemplary embodiment from the previous figures with a completely flipped open holding apparatus 14. Holding apparatus 14 is able to be flipped open up to the point where it is stopped by projections 30 on structural elements 18 or until struts 26 strike projections 30 and prevent a further opening.

If holding apparatus 14 is in a closed position, then this corresponds to an angle of 0°. If holding apparatus 14 is completely flipped open, this corresponds to an angle of 84° in the exemplary embodiment, starting from the closed position of holding apparatus 14.

Moreover, it is shown in FIG. 3 that a cover 32 is fixed in place on receiving part 24. Cover 32 is provided in order to protect electrical connections or electrical components from a fluid, especially from spray water; in the illustrated case, these are electrical connections 80 or electrical components 82 of control unit 22 as they will be shown later in FIG. 10. This allows a technician to carry out service or repair work on the heating device, while contact between electrical connections 80 or electrical components 82 of control unit 22 and spray water, which may end up on holding apparatus 14 during an exchange of pipes in the heating device, for example, is able to be avoided.

Figure 4:
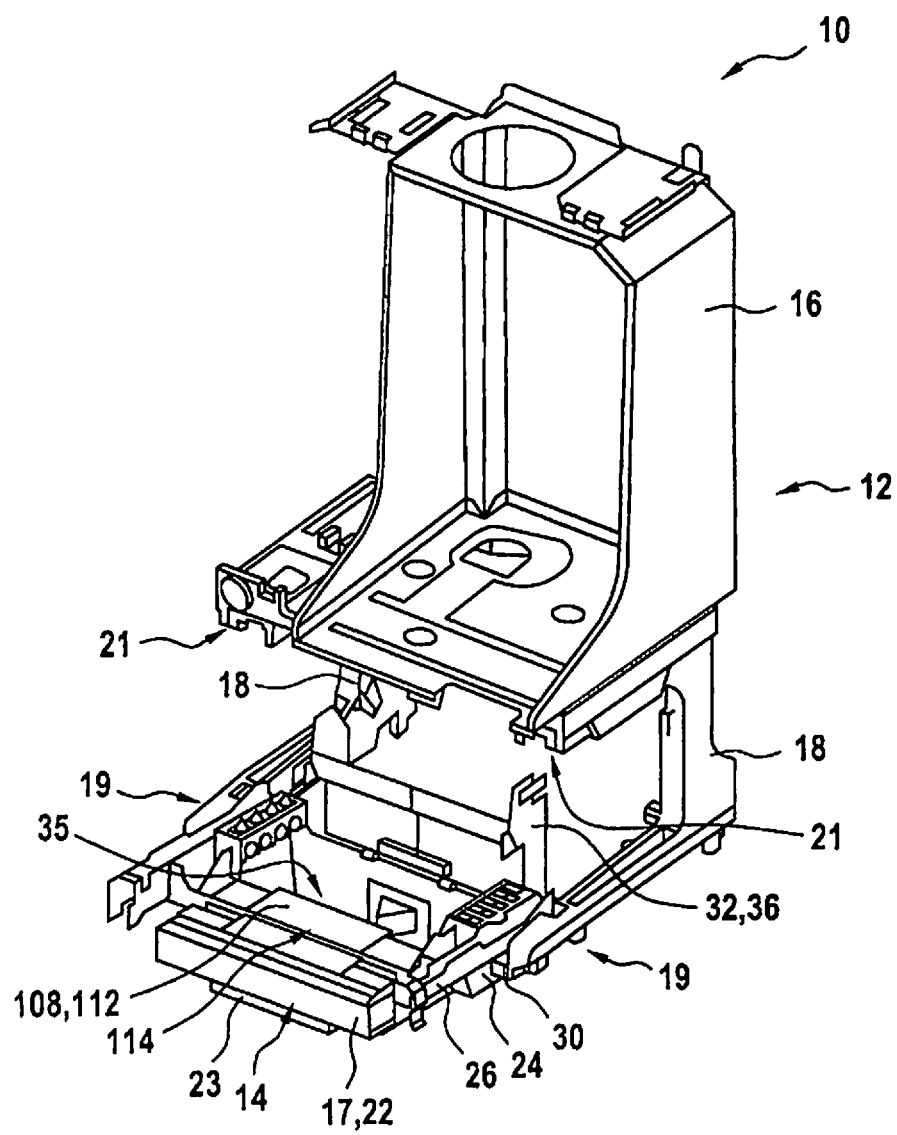
FIG. 4 shows an illustration of the exemplary embodiment from the preceding figures with a holding apparatus completely flipped open and a cover that is flipped open.

Accordingly, FIG. 4 shows an illustration of the exemplary embodiment from the preceding figures with a completely flipped open holding apparatus 14 and a flipped open cover 32. Cover 32 is fixed in place on receiving part 24 in a region 34 that is at a distance from receptacle 28 for control unit 22. This allows cover 24 to be pivoted in such a way that it is able to form an opening area in a region 35 that is close to receptacle 28 for control unit 22, which is toward the front in the illustrated case. The cover is developed in the form of a flap 36.

In the illustrated case, with holding apparatus 14 flipped open, cover 32 or flap 36 is mounted so that it can be pivoted or flipped in the direction of the heating device or housing structure 12, thereby making it possible to improve the accessibility during installation or service work. When holding apparatus 14 and cover 32 are flipped open, as shown in FIG. 4, a technician has access to electrical connections of control unit 22 from the front and is able to carry out required wiring at that location or inspect it there.

Figure 5:
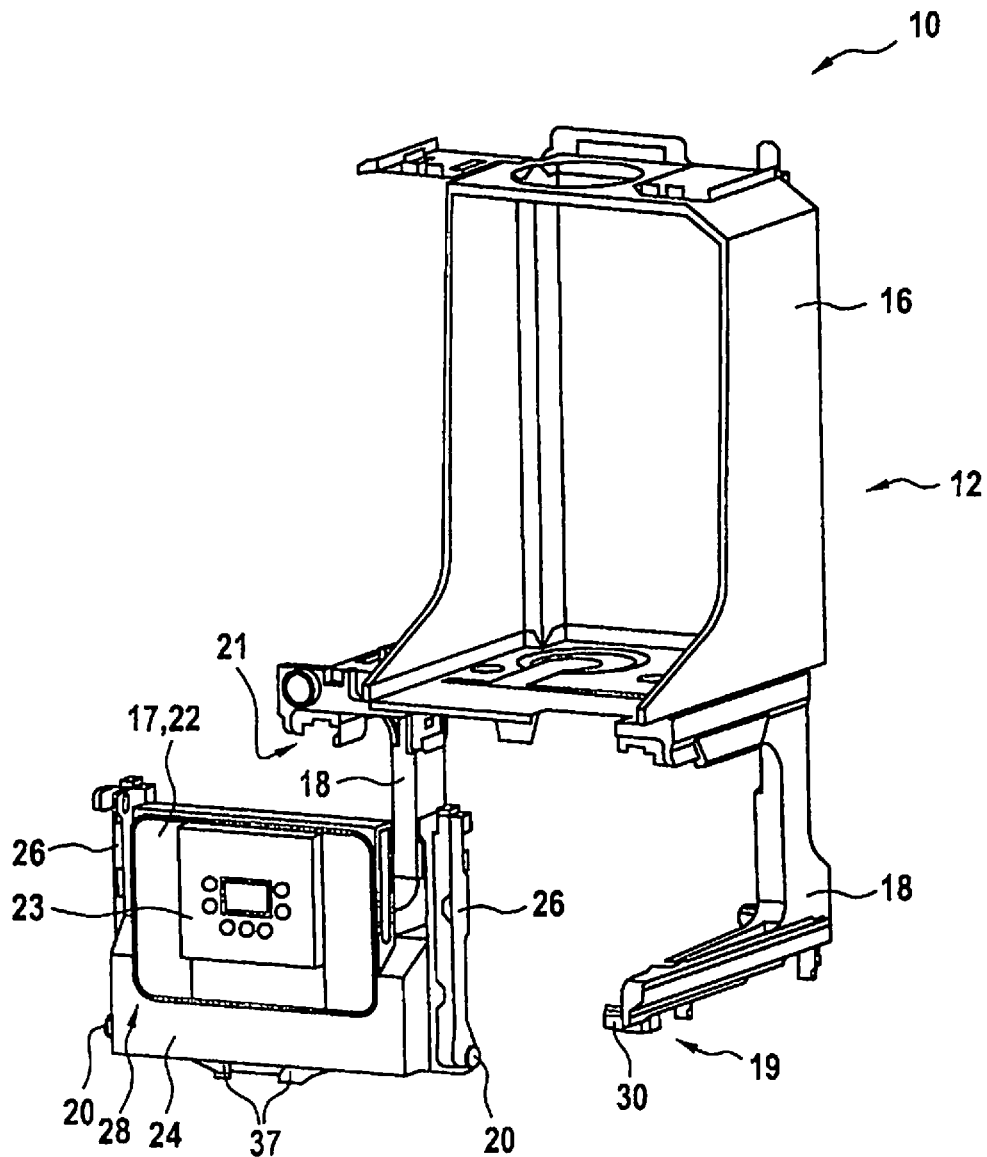
FIG. 5 shows an illustration of the exemplary embodiment from the preceding figures with the holding apparatus removed.

Holding apparatus 14 is mounted on housing structure 12 so that it is able to be removed or also exchanged. Accordingly, an illustration of the exemplary embodiment from the previous figures is shown in FIG. 5 where holding apparatus 14 removed. Due to a clamping connection on the part of housing structure 12 with thrust bearing 20 of holding apparatus 14, holding apparatus 14 is able to be removed at all angles in the illustrated case. However, it would alternatively also be conceivable that holding apparatus 14 is removable at a certain angle such as 45°, e.g., with the aid of a form-fitting connection.

In addition, the holding apparatus has further projections 37 on the front side, which are provided to position a front cover of the heating device at least in its height. Thus, in a holding apparatus 14 that is mounted and closed, a front cover can be installed on the heating device from the front in an especially simple manner, and it is ensured that the front cover is positioned in such a way that operating unit 23 of the heating device, which is accommodated by the housing of control unit 22, is accessible, for instance by way of a cutout in the front cover, so that the user is able to operate operating unit 23.

Figure 6:
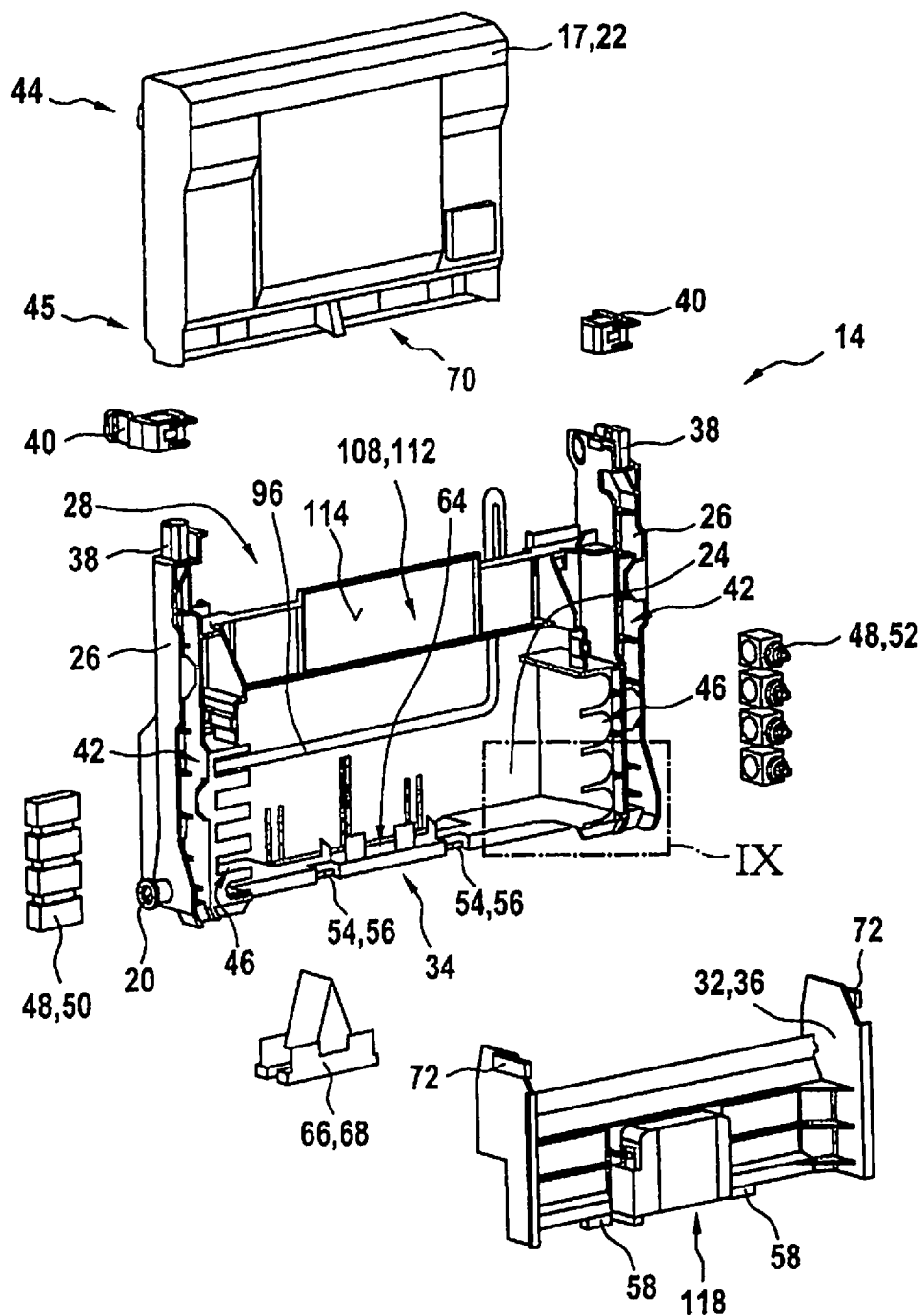
FIG. 6 shows an exploded view of a holding apparatus according to the preceding figures with a control unit.

FIG. 6 shows an exploded view of a holding apparatus 14 according to the preceding figures with a control unit 22. As already mentioned, holding apparatus 14 has a receiving part and receiving part 24 has two struts 26 including a receptacle 28 for control unit 22 that is developed between the two struts 26.

It can also be seen in FIG. 6 that receiving part 24 is developed in a U-shape, whereby the receiving and wiring of control unit 22 is able to be simplified since access to control unit 22 is possible both from the front side and the rear side of receiving part 24. Because of the U-shaped development and the accessibility from the front and rear side of the receiving part, operating unit 23 may also be mounted directly on control unit 22 or the housing of control unit 22. In this way control unit 22 is introduced into receiving part 24 together with operating unit 23.

In the illustrated exemplary embodiment, the two struts 26 have a thrust bearing 20 in each case via which holding apparatus 14 or receiving part 24 is able to be fixed in place on the heating device or on housing structure 12 of the heating device. This allows for a pivotable, or in the illustrated case, a flippable, installation of the holding apparatus on the heating device or on housing structure 12 of the heating device.

In addition, in regions 39 that are at a distance from thrust bearings 20 in the illustrated case, the two struts 26 include a construction 38 for the attachment of a detent element 40 in each case, whereby holding apparatus 14 is able to be easily closed by latching detent elements 40, and be easily opened again by operating detent elements 40. As can be gathered from FIGS. 1 through 5, detent elements 40 latch into place in an upper region 21 of structural elements 18. Accordingly, in a closed position, holding apparatus 14 is mounted via thrust bearing 20 in lower region 19 of the structural elements and via detent elements 40 in upper region 21 of structural elements 18.

The two struts 26 have, or form, a cable duct 42 in each case. Via cable ducts 42, control unit 22 is also able to be wired in an upper region 44, the wiring being able to be routed along cable ducts 42 of struts 26.

In addition, receiving part 24 has receptacles 46 for cable bushings 48, i.e. for sleeves 50 and strain-relief mechanisms 52 in the illustrated case, thereby making it possible to further stabilize and secure the wiring. Traction-relief mechanisms 52, in particular, are able to withstand tractive forces of at least 100 N. Receptacles 46 for cable bushings 48, or sleeves 50 and strain-relief mechanisms 52, are developed adjacent to struts 26, which makes it possible to laterally route the wiring to and from control unit 22. In this way it can be avoided that the wiring runs in a disorganized fashion from holding apparatus 14 to the heating device or to housing structure 12, or vice versa.

As already mentioned, a cover 32 is fixed in place on receiving part 24, which is provided in order to protect electrical connections or electrical components from a fluid, especially from spray water. In the illustrated exemplary embodiment, cover 32 is provided for the purpose of protecting a lower region 45 of control unit 22 from the fluid or spray water. In the illustrated case, it is mainly service region 70 in which a multitude of electrical connections 80 and electrical components 82 are disposed for the electrical connection of control unit 22 to the heating device, that is protected from spray water by cover 32.

It can also be gathered from FIG. 6 that receiving part 24 has means 54 for fastening cover 32 or flap 26. In the illustrated exemplary embodiment, means 54 for fastening cover 32 are axles 56. Axles 56 together with bushings 58 developed on cover 32 form joints 60 or hinges 62, which connect receiving part 24 and cover 32 to each other in a pivotable or flippable manner.

Moreover, receiving part 24 has a receptacle 64 for a switching unit 66, which is a modular unit in the illustrated case and which is provided in order to switch the heating device on and/or off. This makes it relatively easy to mount the switching unit on the heating device.

However, it would alternatively also be possible that switching unit 66 is an actuator unit 68, which is provided to initiate the activation and/or deactivation of the heating device. For example, it would also be possible to initiate the activation and/or deactivation of the heating device via a radio or Internet connection.

Figure 7:
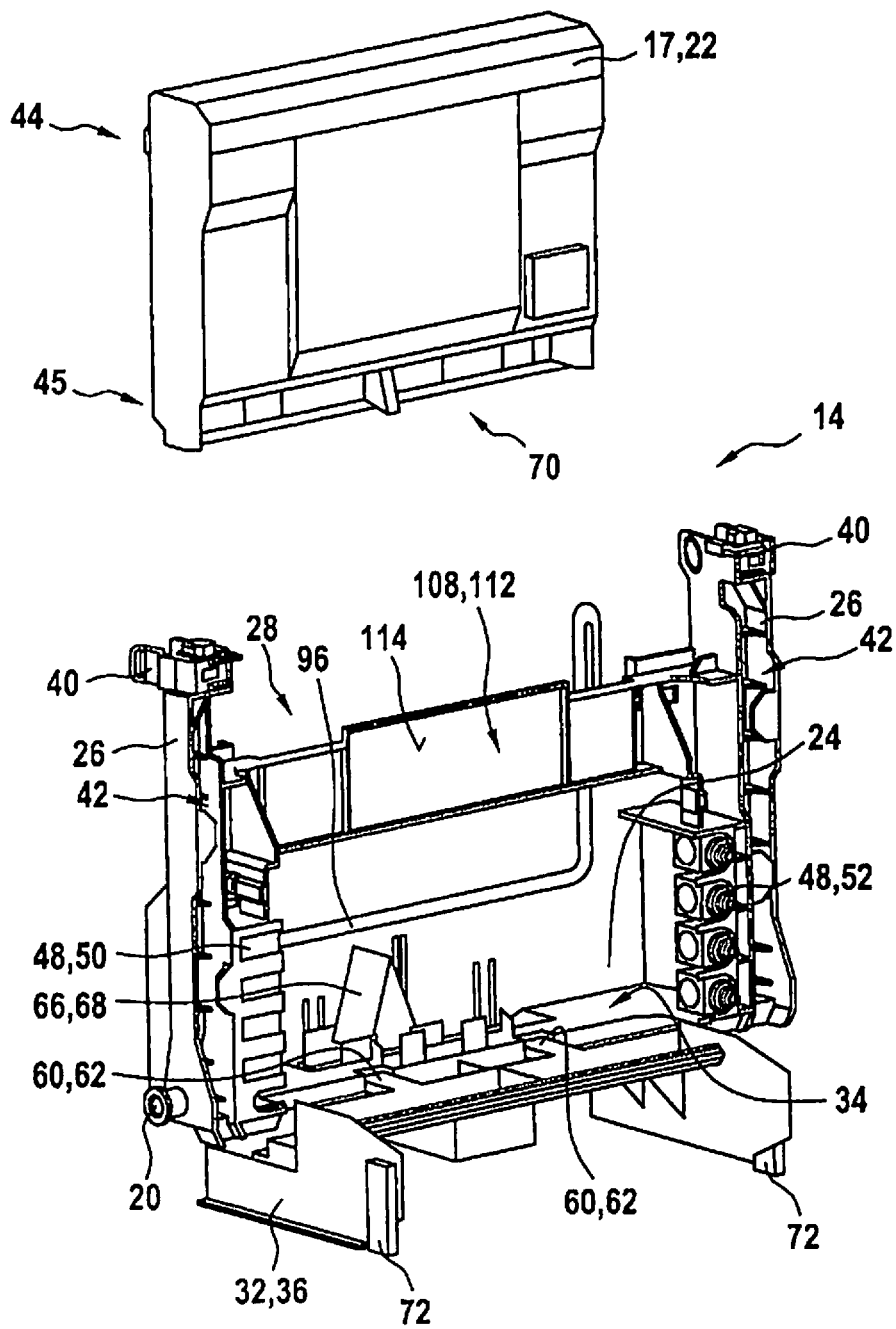
FIG. 7 shows an illustration of a holding apparatus according to the preceding figures with a control unit.

FIG. 7 shows an illustration of a holding apparatus 14 according to the preceding figures with a control unit 22. Cover 32 or flap 36, detent elements 40, cable bushings 48 or sleeves 50, and strain-relief mechanisms 52 as well as switching unit 66 are fixed in place on receiving part 24.

Figure 8:
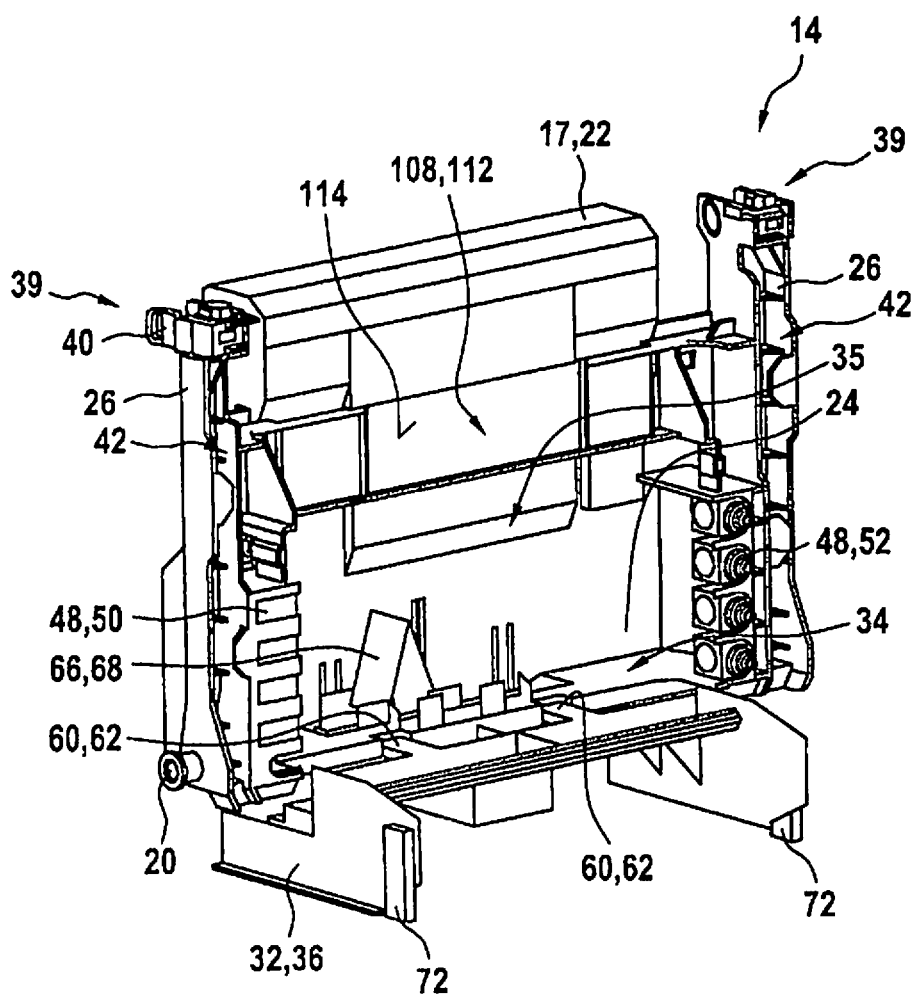
FIG. 8 shows an illustration of a holding apparatus according to the preceding figures with a mounted control unit.

Control unit 22 is introduced into holding apparatus 14 or receiving part 24 by slipping or plugging it into receptacle 28 that is provided for this purpose. Accordingly, FIG. 8 shows an illustration of a holding apparatus 14 according to the preceding figures with a mounted control unit 22.

Control unit 22 is easier to attach to a heating apparatus because of the use of holding apparatus 14. In addition, control unit 22 is disposed so that it is exchangeable on account of holding apparatus 14.

Figure 9:
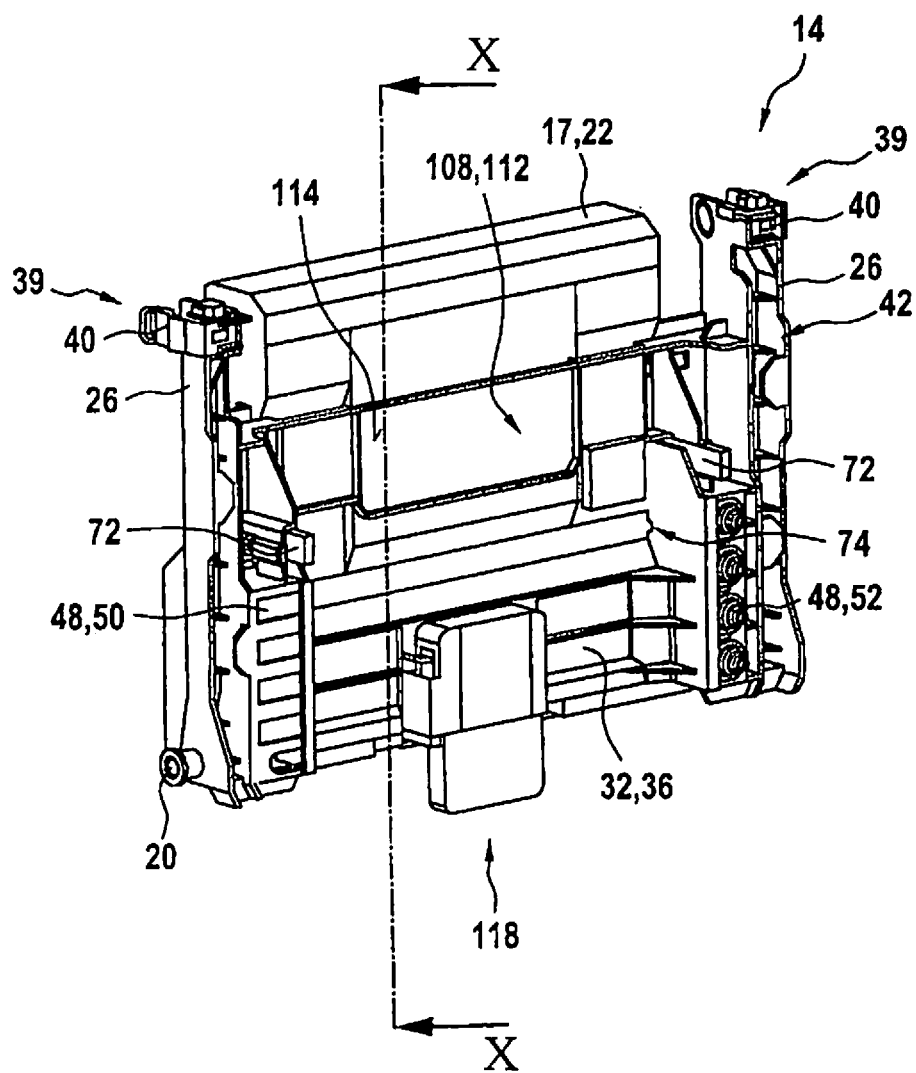
FIG. 9 shows an illustration of a holding apparatus according to the preceding figures with the cover closed.

FIG. 9 shows an illustration of a holding apparatus 14 according to the preceding figures with cover 32 flipped closed. Using further detent elements 72, cover 32 is fixed in place on the receiving part in the closed position. Cover 32 is able to be easily closed by further detent elements 72 snapping into place on the receiving part, and it can be easily opened again by operating further detent elements 72.

In the illustrated case, holding apparatus 14 is shown in a closed position. If it then happens that a fluid such as spray water makes contact with holding apparatus 14, this spray water is essentially able to drain from the outside along cover 32 in a downward direction.

Figure 10:
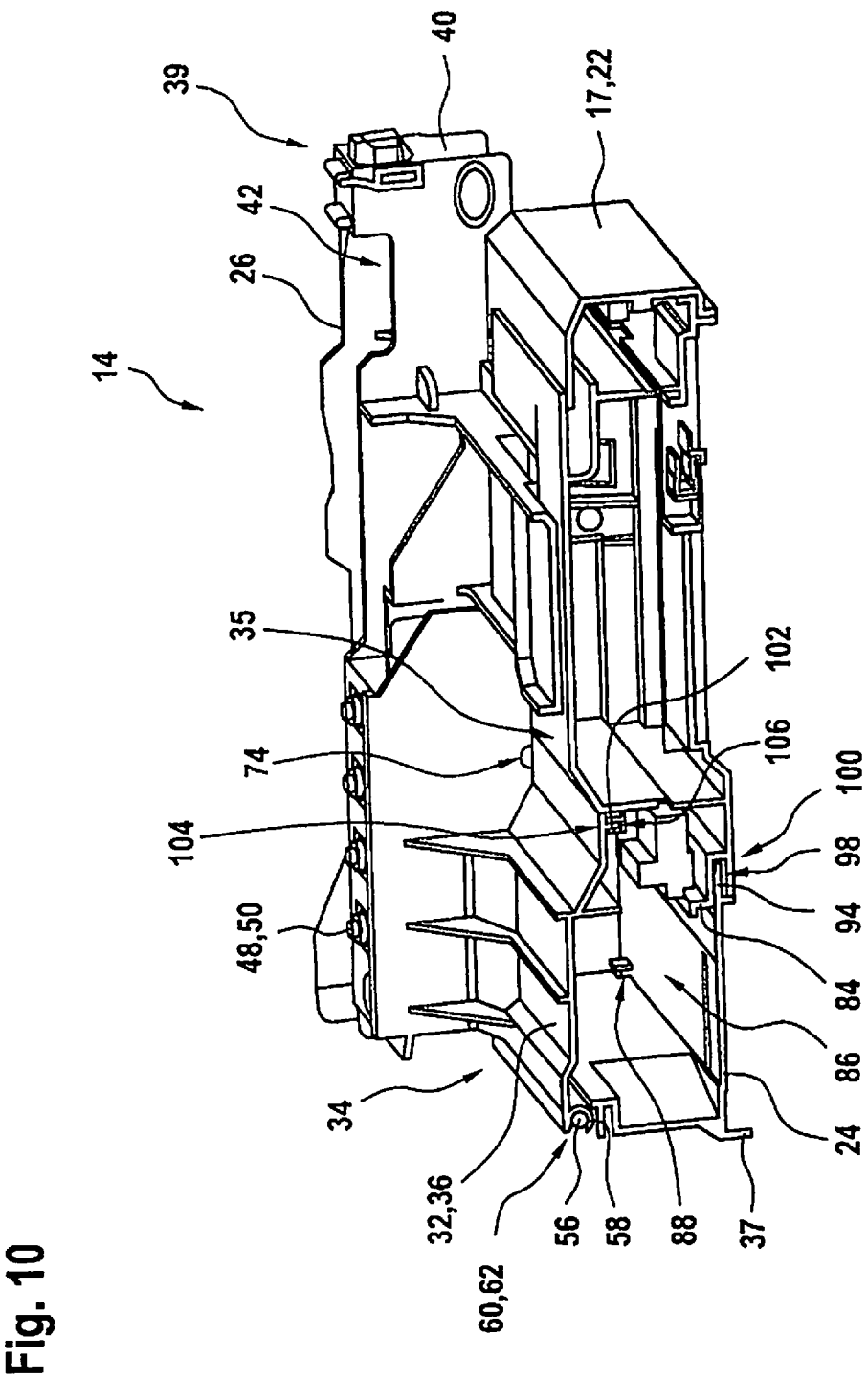
FIG. 10 shows a sectional view of a holding apparatus along line X-X from FIG. 9.

FIG. 10 shows a sectional view of a holding apparatus 14 along line X-X from FIG. 9. Holding apparatus 14 is shown in an open position. As already explained, electrical connections or electrical components are protected from a fluid, especially spray water, by cover 32 or flap 36. In the illustrated case, cover 32 protects electrical connections 80 in service region 70 of control unit 22, which may also be understood as electrical components 82 of control unit 22, from spray water.

In the illustrated case, cover 32 has a shape such that it forms a duct 78 together with control unit 22 or housing 17 of control unit 22, in which spray water is able to collect, e.g., during service or repair work. In addition, cover 32 has openings 74 through which spray water that has collected in duct 78 is able to drain. This avoids a permanent collection of spray water at the same location.

In the illustrated case, spray water that collects in duct 78 is discharged through openings 74 and routed into a cavity 86 between cover 32 and receiving part 24. Since holding apparatus 84 can only be flipped open up to a maximum angle of 84°, the holding apparatus features a downward slope in the open position. The downward slope allows for rapid draining of the spray water, which is guided through openings 74 into cavity 86 along receiving part 24. Receiving part 24 in turn has further openings 88 through which the spray water may finally flow from cavity 86, and thus also from holding apparatus 14. Due to the downward slope, the spray water is able to drain fairly rapidly from holding apparatus 14 without permanently remaining in cavity 86.

In the illustrated exemplary embodiment, housing 17 of control unit 22 is developed in such a way that it forms a trough 84 in service region 70 where electrical connections 80 or electrical components 82 are located as well. This prevents contact between spray water present in cavity 86 and electrical connections 80 or electrical components 82. Accordingly, the spray water in cavity 86 flows past electrical connections 80 or electrical components 82.

In addition, the receiving part has a wall 94 for a labyrinth-type seal 100, in the illustrated case, with control unit 22 or housing 17 of control unit 22. Because of labyrinth-type seal 100, service region 70 on the front side of holding apparatus 14 is able to be sealed in order to protect it from a fluid, especially spray water.

Control unit 22, or housing 17 of control unit 22, in turn has a groove 98 that corresponds to wall 94 and encloses wall 94 when control unit 22 is inserted. Wall 94 and corresponding groove 98 form labyrinth-type seal 100.

Wall 94 has an insertion bevel 96 of its own, which facilitates the insertion. Insertion bevel 96 can be seen more easily in FIGS. 6 and 7, which is why reference is made to FIGS. 6 and 7 at this point. Wall 94 also at least partially forms receptacle 28 for control unit 22 or for housing 17 of control unit 22.

Moreover, the cover includes a projection 102 for a further labyrinth-type seal 104 together with control unit 22 or housing 17 of control unit 22 in the illustrated case. Because of further labyrinth-type seal 104, service region 70 on the rear side of holding apparatus 14 is able to be sealed in order to protect it from a fluid, especially spray water.

Control unit 22, or housing 17 of control unit 22, in turn also includes a further groove 106 that corresponds to projection 102 and encloses projection 102 of cover 32 after the insertion of control unit 22 and the subsequent closing of cover 32. Accordingly, this may also be understood as an introduction of projection 102 of cover 32 into corresponding further groove 106 of control unit 22 or housing 17 of control unit 22 during the closing. Projection 102 and corresponding further groove 106 form labyrinth-type seal 100 in the process.

It is also possible in this instance that projection 102 has a further insertion bevel that makes the insertion easier. By closing cover 32, or by inserting projection 106 into corresponding further groove 106 of control unit 22 or housing 17 of control unit 22, control unit 22 is fixed in place in its provided receptacle 28 and is no longer able to be removed from the receptacle. Only after cover 32 has been flipped open will said affixation be reversed so that control unit 22 is able to be taken out of its provided receptacle 28 again.

In addition, receiving part 24 together with cover 32 forms a cable duct 92 for an electrical wiring of control unit 22 with the heating device. In the illustrated case, receiving part 24 together with cover 32 forms cavity 86, which functions as cable duct 92 for the electrical wiring of the control unit with the heating device. This allows for an organized wiring of the control unit with the heating device.

Figure 11:
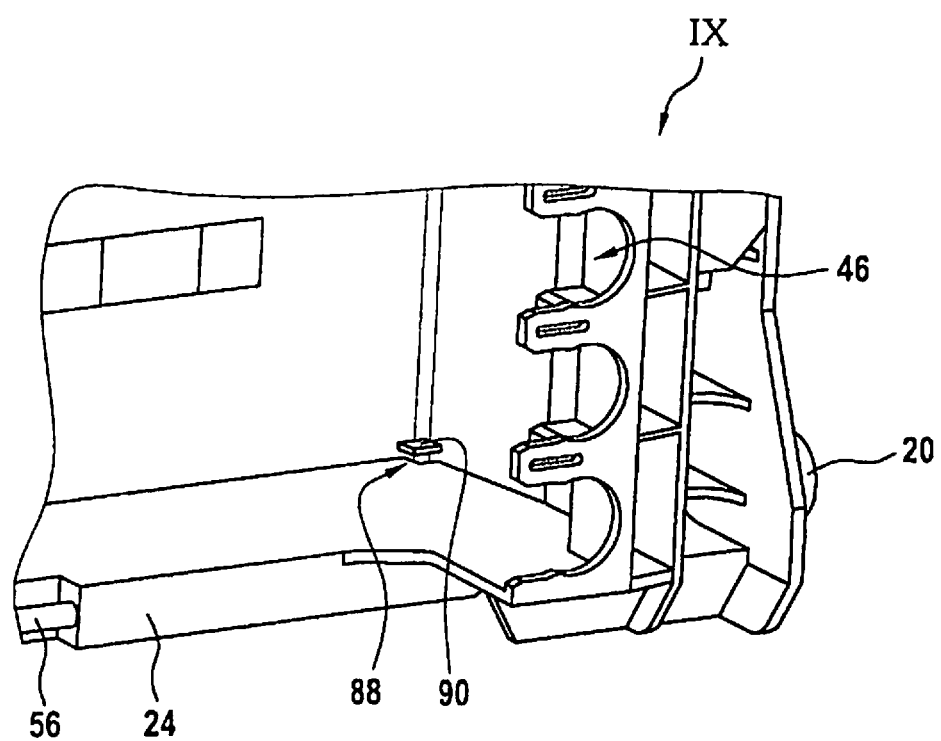
FIG. 11 shows an enlarged view of a detail IX from FIG. 6.

FIG. 11 shows an enlarged view of a detail IX from FIG. 6. Receiving part 24 is aligned according to a closed position of holding apparatus 14. This forms a web 90 above further opening 88 in each case. Web 90 makes it possible to prevent dust from dropping from above into further openings 88 and clogging further opening 88.

Figure 12:
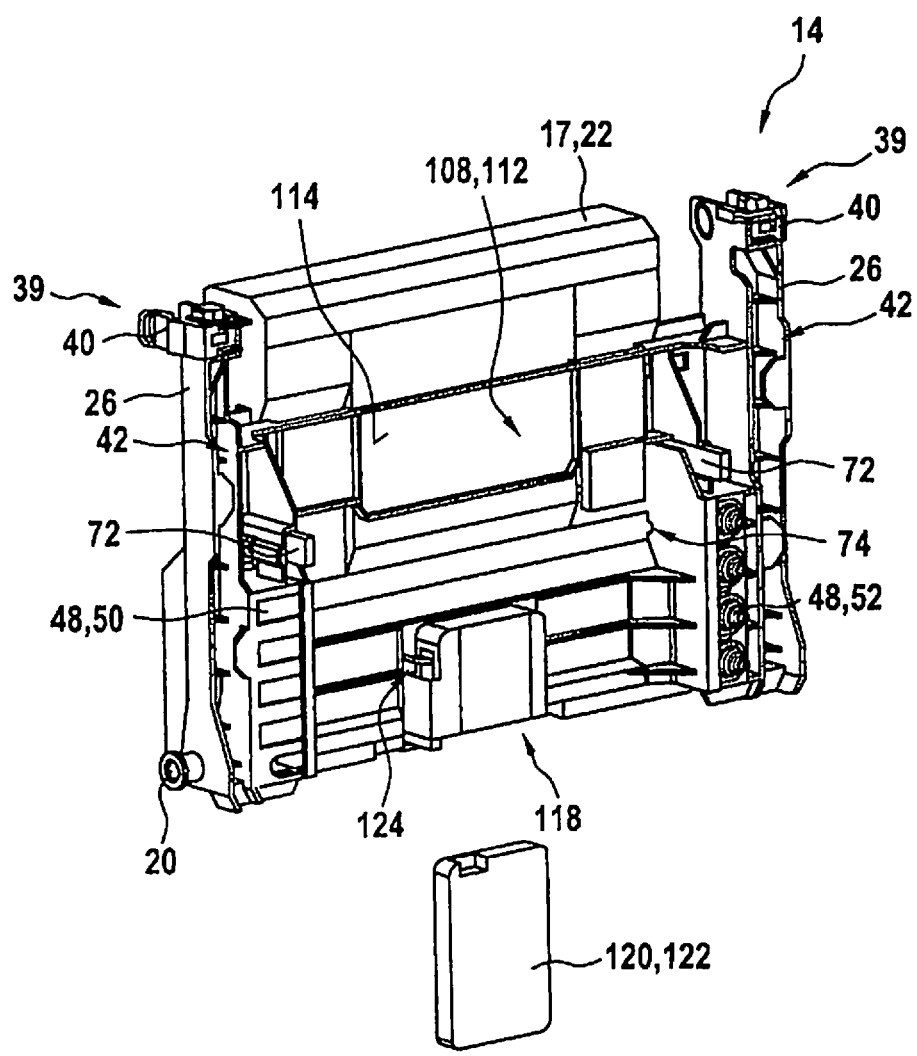
FIG. 12 shows an illustration of a holding apparatus according to the preceding figures including a module for expanding the control unit.

In addition, the cover has a receptacle 118 for a module 120, which is an interface module 122 in the illustrated case, for the expansion of control unit 22, which allows for a particularly uncomplicated expansion of the heating device. Accordingly, FIG. 12 shows an illustration of holding apparatus 14 according to the preceding figures, which is provided with such a module 120, or interface module 122, for the expansion of the control unit. It is sketched in FIG. 12 that module 120 is inserted into provided receptacle 120 where it is then fixed in place in said receptacle 118 with the aid of a locking device 124.

Figure 13:
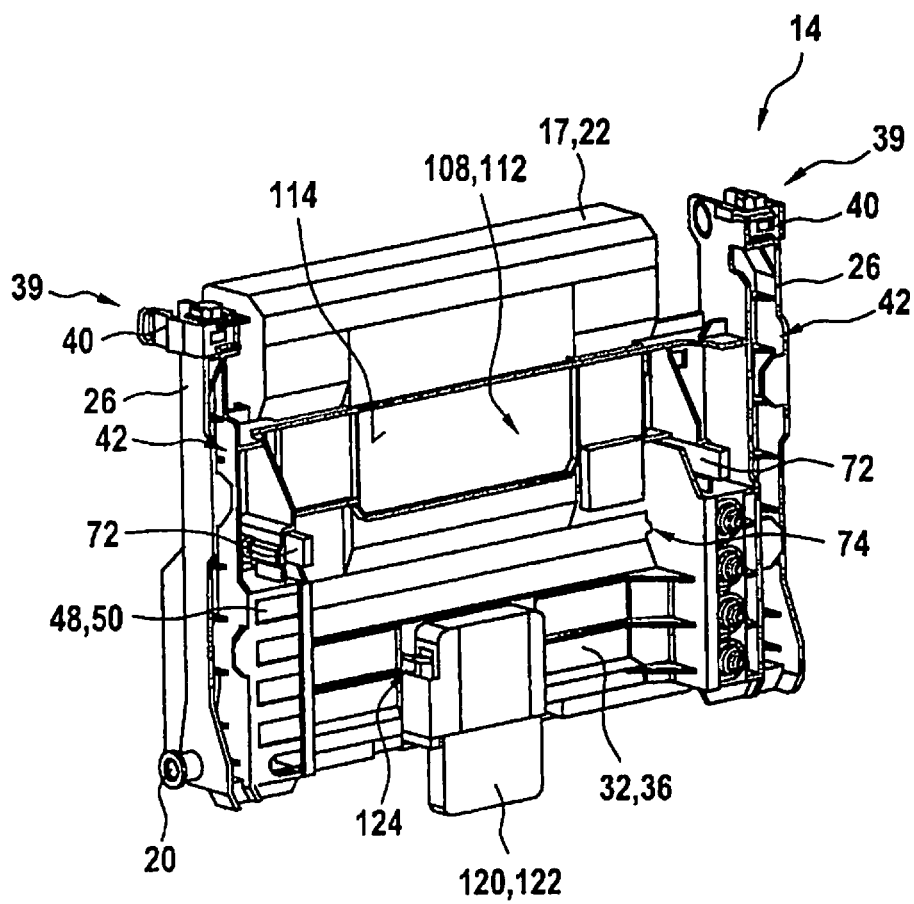
FIG. 13 shows a further illustration of a holding apparatus according to the preceding figures including a module for expanding the control unit.

Accordingly, FIG. 13 shows a further view of holding apparatus 14 according to the preceding figures, including a module 120, or an interface module 122, for an expansion of control unit 22.

In the illustrated case, module 120 is already mounted in provided receptacle 118. A removal of module 120 is possible by operating locking device 124, thereby making module 120 exchangeable. Depending on the type of module 120, technically different expansions of the heating device are therefore possible.

Figure 14:
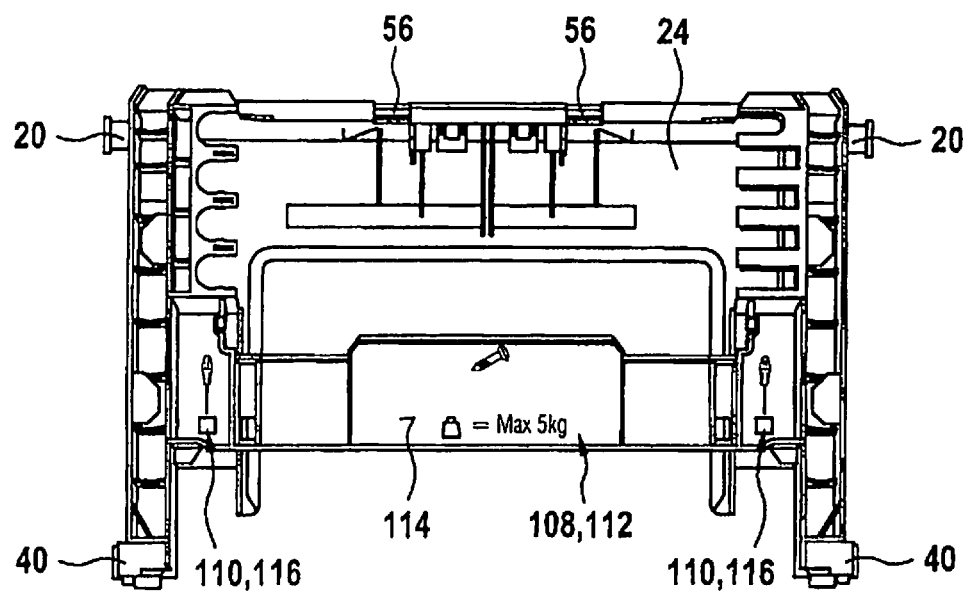
FIG. 14 shows an illustration of a receiving part of a holding apparatus according to the preceding figures.

FIG. 14 shows an illustration of a receiving part 24 of a holding apparatus 14 according to the preceding figures. This is a plan view as it would be seen from the perspective of a technician when holding apparatus 14 is in the flipped open position; however, only receiving part 24 with detent elements 40 is shown but no control unit 22 and no cover 32.

Receiving part 24 has a storage tray 108 for tools and at least one receptacle 110 for tools; in the illustrated case, it has two receptacles 110 for tools. This allows a technician to put down his tools, e.g., during service or repair work.

Storage tray 108 for tools, and the two receptacles 110 for tools, are developed between the two struts 26, which makes it possible to develop storage tray 108 for tools and the two receptacles 110 for tools in such a way that they provide a particularly stable support.

In the illustrated case, storage tray 108 for tools is developed between the two receptacles 110 for tools. In this way, storage tray 108 for tools is developed adjacent to the two receptacles 110 for tools, which allows a technician to store his tools in an orderly and uncluttered fashion.

Storage tray 108 for tools is developed as a cross member 112 including a storage area 114, which makes it possible to provide a particularly large storage area 114 where a technician may place screws or the like, for example.

Storage tray 108 for tools or storage area 114 has a loading capacity of up to 5 kg and thus provides for a high load bearing capacity of storage tray 108, which allows a technician to place a multitude of tools on storage tray 108.

In addition, storage area 108 for tools at least in part forms receptacle 28 for control unit 22, which additionally stabilizes control unit 22 in receptacle 28. The insertion of control unit 22 is also made easier since storage area 108 may function as an insertion guide.

The two receptacles 110 for tools are developed in the form of openings 116, which are able to accommodate the tools, i.e. mainly screwdrivers in the illustrated case. For example, screwdrivers are able to be hooked into receptacles 110 for tools or into openings 116. In addition, receptacles 110 for tools, or openings 116, may serve as openings for the drainage of water in the event that spray water collects around receptacles 110, such as during service or repair work.

What is claimed is:

1. A heating device, comprising:
 a holding apparatus to accommodate a control unit, the holding apparatus having a receiving part, the receiving part having at least two struts, and a receptacle for the control unit between the at least two struts;
 wherein at least one of the at least two struts has at least one thrust bearing via which the holding apparatus is able to be attached to a housing structure of the heating device; and
 wherein at least one of the at least two struts has at least one construction for the attachment of detent elements, in a region that is at a distance from the thrust bearing.

2. The heating device as recited in claim 1, wherein the receiving part is U-shaped.

3. The heating device as recited in claim 1, wherein at least one of the at least two struts has and/or forms a cable duct.

4. The heating device as recited in claim 1, wherein the receiving part has at least one receptacle for cable bushings, the cable bushings including at least one of sleeves and strain-relief mechanisms, adjacent to at least one of the at least two struts.

5. The heating device as recited in claim 1, wherein the receiving part has at least one means for attaching a flap, which is able to protect electrical connections or electrical components from a fluid.

6. The heating device as recited in claim 1, wherein the receiving part has at least one of a duct, and an opening for the drainage of water.

7. The heating device as recited in claim 1, wherein the receiving part has a receptacle for a switching unit, the switching unit including at least one of a modular switching unit, and an actuator unit to at least one of carry out and initiate activation and/or deactivation of the heating device.

8. A holding apparatus for a heating device, the holding apparatus comprising:
 a receiving part having at least two struts; and
 a receptacle for a control unit between the at least two struts;

wherein at least one of the at least two struts has at least one thrust bearing via which the holding apparatus is able to be attached to a housing structure of the heating device; and wherein at least one of the at least two struts has at least one construction for the attachment of detent elements, in a region that is at a distance from the thrust bearing.

\* \* \* \* \*